March 2, 1965    W. ANDERSEN    3,171,728
METHOD OF ELIMINATION OF SETTLE-BLOW IN MAKING BOTTLES
Filed May 23, 1960    4 Sheets-Sheet 1

INVENTOR.
WALTER ANDERSEN

March 2, 1965  W. ANDERSEN  3,171,728
METHOD OF ELIMINATION OF SETTLE-BLOW IN MAKING BOTTLES
Filed May 23, 1960  4 Sheets-Sheet 3

INVENTOR.
WALTER ANDERSEN
BY

March 2, 1965     W. ANDERSEN     3,171,728
METHOD OF ELIMINATION OF SETTLE-BLOW IN MAKING BOTTLES Filed May 23, 1960     4 Sheets-Sheet 4

INVENTOR.
WALTER ANDERSEN
BY

United States Patent Office 3,171,728
Patented Mar. 2, 1965

3,171,728
METHOD OF ELIMINATION OF SETTLE-BLOW
IN MAKING BOTTLES
Walter Andersen, Streator, Ill., assignor, by direct and mesne assignments, to Chem-Met-Anderson Engineering Company, Chicago, Ill., a corporation of Illinois
Filed May 23, 1960, Ser. No. 30,818
4 Claims. (Cl. 65—76)

This invention relates in general to the method and apparatus for the elimination of settle-blow in making bottles, and may be more particularly described as a vacuum pressure method and apparatus for replacing, improving and speeding up the manufacture of bottles.

In the manufacture of bottles, the settle-blow process pertains to that portion of making or blowing the finish which is brought about by compressed air forced in a downward direction at the heel of the bottle blank, from a forged head which is called the baffle. This baffle and air pressure is controlled by valves on the bottle making machine which regulate the timing and the necessary air pressure to blow or complete the finish.

In this method which all bottle companies have been using, there are many major defects which cause many bottle rejects and much lost time particularly with bottles that have a small mouth opening such as beer and other beverage bottles, cosmetic bottles, and the like. In this old method of producing the finish, the difficulty is in controlling the distribution of glass in the side panels due to settle-blow motion in making the finish. Uneven distribution of glass in the sides of the bottle are caused by cold air forced in by the settle-blow air which is needed to make the finish, and this causes too much breakage for beer and beverage bottles as it is during the filling process of the bottles that this major defect becomes apparent and shows up. This breakage of the bottles during the filling operation causes a great loss of time and liquid.

This old method of settle-blow forces glass into the neck region in order to make the proper finish, although leaving too much glass where it is not needed to make a good bottle. The excess glass forced into the neck region by the settle-blow tends to remain there because the counter-blow air used to blow the glass out of the neck cannot do the job properly for the glass has become chilled by this time and tends to remain there. With an excessive amount of glass left in the neck of the bottle, it now becomes necessary under the old method to add more glass to compensate for that which could not be removed from the neck of the bottle. This means that more glass is added to the bottle than is really needed to make a satisfactory perfected bottle and is known as the settle-blow defect.

Another objection of the settle-blow operation in making glass bottles is that due to the fact that it requires compressed air to blow out the finish in the neck region of the bottle which affects the temperatures of the glass at the neck and sides of the blanks, which causes more defects in operation if any attempt is made to speed up the production of the glass bottle machines. The glass companies cannot begin to reach any greater speeds in reduction until the settle-blow method has been changed or replaced. The present vacuum method eliminates this objection and permits a continued increase in speed of the bottle machines and at the same time producing lighter quality bottles.

Another present process is called the 62 method, or the Press and Blow Method. In this method, the finish is perfected with a plunger that presses out the finish instead of blowing it out. When it is necessary to change from a blow and blow process to a press and blow process, it takes a great deal of time to convert a glass bottom machine from one method to the other due to the fact that the cylinders on the machine as well as the control buttons on the operation drum must be altered and changed. It requires more control buttons on the timing drum to produce a blow and blow bottle than it does for a press and blow bottle and it takes time to add control buttons or to remove them for the actual change to be complete, or to perform what is known in the glass industry as a conversion.

With the present valve structure and operating method, the number of control buttons on the operating drum would be the same and time spent for the changes are eliminated forever, which in itself would increase the efficiency and be a great relief in the matter of time to the glass industry. In an old method of making bottles, there are also the problems concerning the plunger and neck ring cooling which has a great deal to do wtih the settle-blow method, for when compressed air is blown into blank above the glass to blow out the finish, no air can reach the plunger area for cooling purposes. This causes glass companies to spend a great deal of time and money for equipment to get air to the plunger and neck ring areas in an attempt to obtain greater speeds with much of such efforts entirely wasted.

The present invention relates to the elimination of the old settle-blow method by substituting a vacuum-pressure blowing method for new and faster operation and for more efficient cooling in the finish area of the neck ring, plunger, and blank sides of the bottle.

An important object of the invention is to provide a vacuum flow valve to eliminate the settle-blow method by inducing vacuum instead of compressed air to form the finish.

A further object of the invention is to provide a valve and a method which controls vacuum and counter-blow air through the same passage without either flow interfering with the other.

Still a further object of the invention is to provide a construction and apparatus for controlling the vacuum to have direct contact with the hot glass in the neck area for more efficient cooling of the glass in the neck area permitting the counter-blow to be applied 15° or more earlier in the cycle of operation.

A further object of the invention is to eliminate excess glass which normally would be left in the neck area by the settle-blow method by applying vacuum and counter-blow in a shorter time, eliminating the cause of light side panels in bottles, and the like.

A further object of the invention is to provide a combined vacuum and air flow valve which is adapted to be applied as an attachment to existing settle-blow machines to convert them to vacuum blow machines in the least time and with the least expense.

A further object of the invention is to provide means and apparatus for improving the finish at the bottom end and neck by means of a one motor valve and through a single line to the finish by means of a single controlling valve with precise vacuum control.

Still another object of the invention is to improve the finish and control of the amount of glass in a blank at all times in which only the desired and necessary amount of glass is left in the neck region to make the bottle strong and then blowing the rest of the glass into the body by a counter-blow 15-20° earlier in the cycle than in the settle-blow method resulting in lighter bottles, less raw material for each bottle and saving of raw material at greater speeds of reduction and resulting in less breakage and less defective wear in actual use of the bottles.

Other and further objects of the invention will appear in the specification and will be apparent from the accompanying drawings in which.

In this invention, a valve and a plunger together with their associated and connected parts are altered and changed from the forms of these devices as commonly employed in a glass making machine to provide a vacuum and counterblow of air through the same passage without either flow interfering with the other for improving a bottle surface finish and eliminating the objections of settle-blow, to speed up the making of bottles and to improve the distribution of glass in the neck and sides of the bottles so that they have less tendency to break when they are being filled and subsequently used.

In order to describe the present improved method and apparatus, brief reference is made to certain parts of existing machines to which the new apparatus is applied for accomplishing the desired results, but it is believed unnecessary to show a complete bottle making apparatus, and therefore only the necessary cooperating parts are shown and described in connection with the new parts in order that the present method and apparatus may be clearly understood.

Figures 1, 1A, 1B:
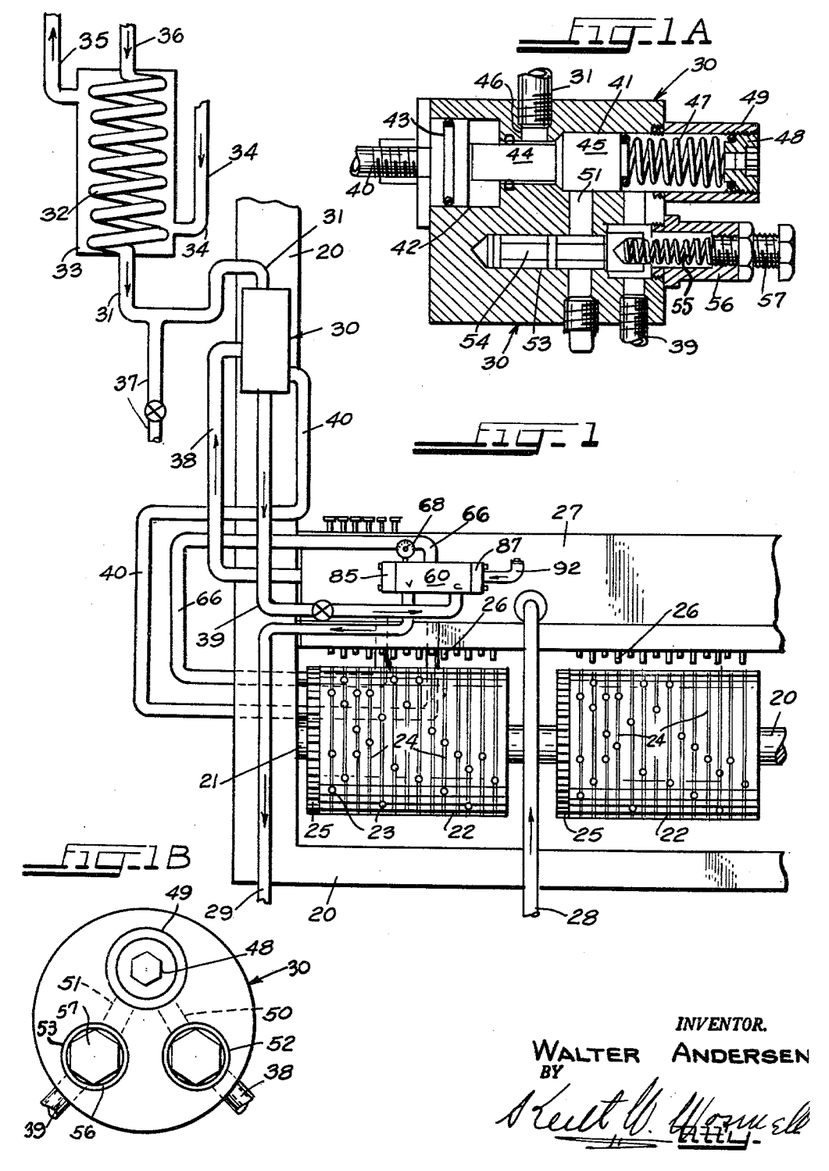
FIG. 1 is a somewhat diagrammatic view showing a vacuum-pressure valve in accordance with the present invention as applied to one portion of an ordinary and well known type of glass bottle making machine as operated by its control drum in a well known conventional form.
FIG. 1A is a sectional view of a change-over and cold air valve as included in FIG. 1.
FIG. 1B is an end view of the cold air valve.

As shown in FIG. 1, a portion of a frame 20 in which the bottle making equipment is mounted, which comprises a drive shaft 21 upon which is mounted a timing drum 22 with operating buttons 23 thereon adjustable in slots 24 for varying the relative angular positions on the drum which is rotated continuously in one direction by a drive gear 25. These buttons 23 are moved by the drum into and out of engagements with trip buttons 26 mounted in a valve block 27 for controlling the air pressure which is supplied in the ordinary bottle making operations.

Connected to the valve block is an air pressure main line 28 which receives pressure, usually 33 lbs. or more from a suitable source of air pressure, and a negative air pressure or vacuum line 29 which also extends to a suitable vacuum inducing device. Both the air pressure and vacuum producing devices are well known and form no part of the present invention.

A cold air valve 30 is conected by a chilled air pipe 31 with an air coil 32 in a cooling tank 33 which is shown with a water inlet 34 and a water outlet 35. At the other end of the air coil 32, it is connected with an air supply pipe 36 which leads to a suitable source of air supply. The chilled air pipe 31 may be connected by a tap line 37 for supplying chilled air to other heads.

Extending from the cold air valve 30 to a vacuum flow valve 60 on the block 27 is a chilled air line 39 for counterblow cooling and another chilled air line 38 leads from the block 27 to the cold air valve 30 for blow-and-blow cooling. Extending from the valve block 27 to the cold air valve is a counterblow pipe line 40 for opening the cold air valve to supply chilled air through the air line 38 or 39 (see also FIG. 2).

The cold air valve is shown more clearly in FIGS. 1A and 1B comprises a shouldered bore 41 having an opposite valve recess 42 connected with counterblow pipe 40 and having a plunger 43 in the recess engaged by a stem 44 of a plug valve 45 seated in the larger portion of the bore 41 with the stem 44 adapted to extend through the smaller portion of the bore into engagement with the inner or under side of the plunger 43.

Connected into the smaller portion of the bore below the plug valve 45 is a passage 46 which is connected with the chilled air pipe 31. The plug valve 45 is normally held closed upon its seat by a coil spring 47 having one end engaging the valve and the other end engaging an adjustable plug 48 threaded in the inside of a sleeve 49 which in turn is threaded into the outer end of the bore 41.

Extending from the periphery of the larger portion of the bore 41 are bores 50 and 51 which intersect bores 52 and 53 which are connected to the chilled air lines 38 and 39 respectively. In each of the bores 52 and 53 is a valve 54 movable and each manually adjustable in its bore to open or close its connection 50 or 51 with the bore 41. The bores 52 and 53 extend through one end of the block of the cold air valve 30 and the end of the valve is engaged by one end of a coil spring 55 which extends into a sleeve 56 secured in and projecting from the block and having an adjustment screw 57 in the outer end of the sleeve 56 by means of which either valve may be opened or closed in changing the cold air line from a press-and-blow connection to a blow-and-blow connection or vice-versa.

The present invention provides a new vacuum flow valve 60 which is positioned on the valve block 27 and is to eliminate the settle-blow action or instead of using compressed air, vacuum is induced at the finish area and through the cylinder of the conventional Hartford machine requiring no alteration to the cylinders as the vacuum is drawn through the same channel and lines that compressed air is blown in and through for the previously used counterblow.

Figure 2:
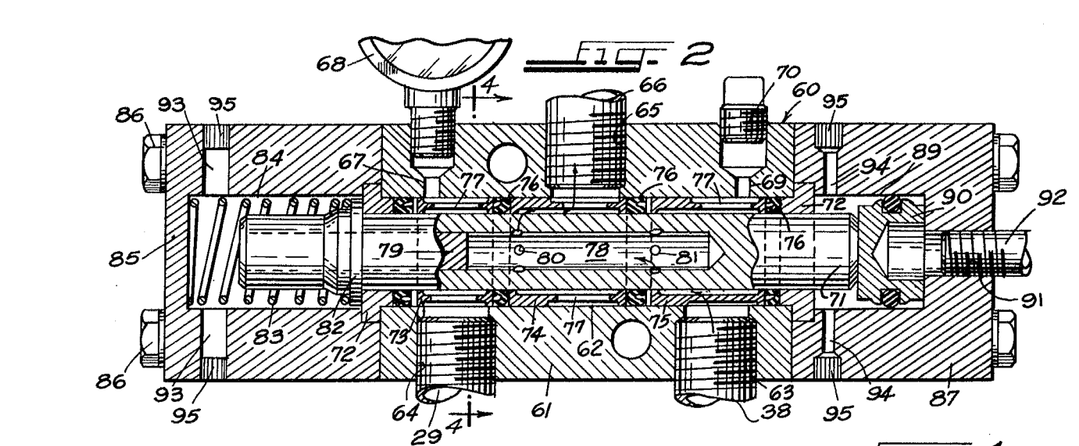
FIG. 2 is an enlarged sectional view of the combined vacuum and power valve shown in FIG. 1 as a part of the present invention applied to a conventional glass bottle making machine for eliminating settle-blow through a common vacuum-pressure connection, showing a movable plunger in one position.
Figure 3:
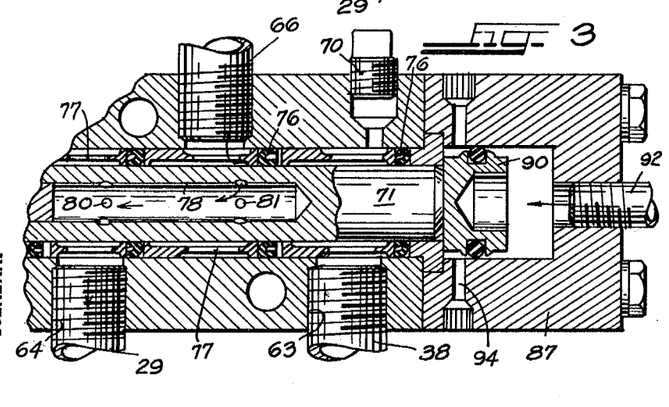
FIG. 3 is a fragmentary view of the valve in FIG. 2, but showing the movable plunger in another limiting position.
Figure 4:
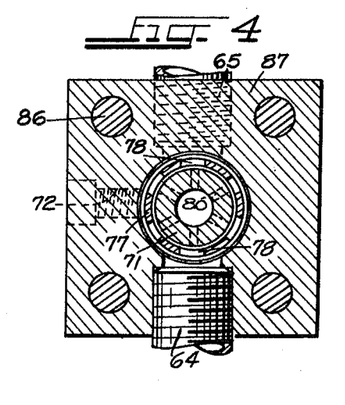
FIG. 4 is a sectional view as taken on the line 4—4 of FIG. 2.

This valve is shown in detail in FIGS. 2, 3 and 4 and comprises a central block 61 with a transverse and uniform central bore 62 extending from end to end through the block. Connected with this bore is an inlet passage 63 connected to the counterblow cooling or chilled air line 38, the outlet passage 64 spaced therefrom to which the vacuum line 29 is connected and on the outside side of the block between the passages 63 and 64 is a passage 65 forming a single line connection to a single line 66 for both counterblow and vacuum to the glass making blank.

At the upper side of the block opposite the vacuum outlet passage 64 is a passage 67 to which a vacuum gauge 68 may be connected. Likewise at the upper side of the block opposite the inlet pressure passage 63 is a passage 69 to which a pressure connector may be applied, but shown is a plug 70 for closing the opening.

Movable within the block 61 is a plunger 71 slightly less in diameter than the bore 62 and seated at the ends of the block by shouldered collars 72 which extend between the plunger and the inside of the bore 62 and overlap the ends of the block around the bore. These collars mount the plunger for controlled endwise movement and affording spaces surrounding the plunger intermediate the ends for receiving sleeves 73, 74 and 75 separated from each other and from the inner projecting portions of the collars 72 by gaskets 76. The gaskets and the sleeves fill up the space and make a fluid-tight connection for each sleeve entirely around the plunger 71 and the sleeves are arranged with the sleeve 73 at the inner end of the outlet passage 64, the sleeve 74 opposite the inner end of the passage 65 and the sleeve 75 opposite the inner end of the inlet passage 63. The sleeves have perforations 77 in the walls between their ends so that the fluid from any one of the said passages may flow freely to the adjacent surfaces of the plunger 71 which is movable endwise for connecting the passages.

In the plunger is a central bore 78 extending from one end of the plunger and having a plug 79 to close the bore at that end with a plurality of radial space openings 80 and 81 extending through the wall of the plunger from the inlet bore 78 to the outlet bore thereof and located a distance apart equally to slightly more than the spaced distances of the two central gaskets 76 so that these openings will form the communication between the passages 63, 64 and 65 in accordance with the position of the plunger 71.

At one end of the plunger 71 is a collar 82 which abuts the collar 72 surrounding the plunger at that end and limits the movement of the plunger inwardly through the block 61 at that end. The plunger is pressed normally with its collar 82 against the collar 72 by a coil spring 83 surrounding the end of the plunger and one end of the spring engaging the collar 82 while the other end of the spring engages the outer end of a recess 84 in a cap 85 which is applied to the adjacent end of the block 61 by fastening bolts 86.

At the other end of the plunger is a cap 87 applied to the end of the block by bolts 88 and having a cylindrical recess 89 surrounding the adjacent end of the plunger 71 which projects a limited distance through the adjacent collar 72. In the recess 89 is a piston 90 which engages the adjacent end of the plunger 71 for moving it endwise against the spring 83 at the other end of the plunger. This movement by the piston is effected through a passage 91 in the end of the cap 87 which is connected to a pressure trip line 92 which extends to a button chamber where pressure is admitted thereto in timed relation due to the engagement of one of the trip buttons 26 controlled by the rotation of its operating drum 22.

The operation of this valve in its two limiting positions is readily seen in FIGS. 2 and 3. In FIG. 2, communication is afforded from chilled air line 38 through inlet passage 63 through sleeve 75 and openings 81 to the inside bore of plunger 71, and thence through openings 80 and perforations in sleeve 74 to passage 65 leading to the single control line 66 for forming the glass parisons. When the position of the plunger 71 is changed by the operation of the piston 90 as shown in FIG. 3 under the influence of air pressure from the trip line 92, the piston 90 engages the adjacent end of the plunger 71 and forces it against the spring 83 at the opposite end until the piston engages the adjacent collar 72 thereby accurately spacing the plunger in its other limiting position. At this time, the openings 80 and 81 are moved to the opposite sides of the adjacent gaskets 76 thereby closing the connection between the inlet passage 63 and the combined pressure and vacuum pressure 65 and opening the vacuum connection from the passage 65 through the ring sleeve 74 and plunger openings 81 to the interior bore 78 of the plunger, and thence through the other plunger openings 80 and through the openings in the ring sleeve 73 to the vacuum outlet passage 64 and its connected vacuum line 29 which extends to the vacuum inducer.

This change from one position to the other is effected so quickly that there is no lag or build-up in pressure between the said passages and the openings and bore of the plunger so that the action is practically instantaneous in changing the single line 66 from pressure to vacuum or vice versa whenever it is desired.

In making these quick changes in the vacuum flow valve, it is necessary to prevent a build-up of pressure or vacuum at either end of the plunger 71 and the cap 85 is provided with one or more vents 93 and the cap 87 is provided with one or more vents 94 each of which is provided with an air pervious plug 95 at its outer end so that air may flow freely into and out of the passages to the recesses 84–89 respectively in the caps.

Figures 5, 6, 7:
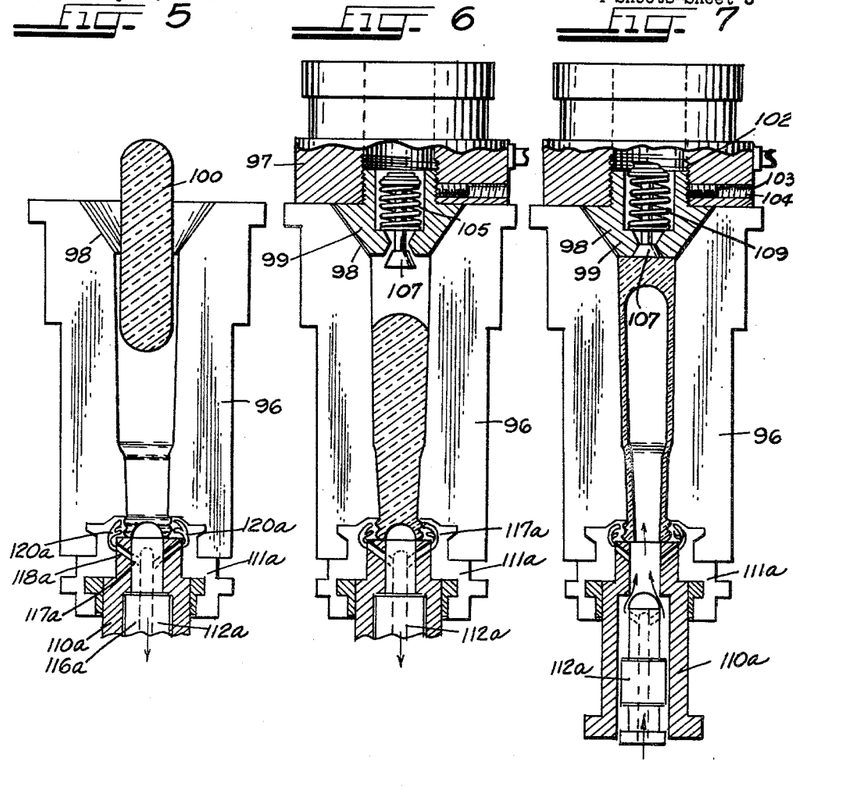
FIGS. 5, 6 and 7 are functional diagrams and part sectional views illustrating the delivery of a gob of glass through a funnel elimination opening (FIG. 5), the settle-blow to form the neck portion of a bottle (FIG. 6), and the counterblow to form the parison (FIG. 7) before the transfer of a blank mold to a blow-mold as it occurs in a conventional machine to which the present vacuum-pressure apparatus and method is applied.

In the old method now commonly used by all glass factories, a separate funnel is used to guide a measured gob 100 of glass into a bottle forming blank mold 96 as shown in FIG. 5 after it falls from a feeder which is not shown herein. This action is controlled by timing buttons on the control drum 22 and requires about 35–45° of drum timing which slows down any effort to gain greater speed and to make better bottles.

In the 62 or Press-and-Blow Method now used, a funnel is used only for guiding the glass into the blank mold, but in the Blow-and-Blow Method, a funnel remains on the blank mold until the settle-blow has blown out the finish. In the later method, a funnel thus serves as a spacer between a blank mold as 96 and a baffle 97 when blowing out the finish with compressed air. After the finish has been blown, the baffle then moves off of the funnel so that the funnel can next be moved off. After this movement of the funnel, the baffle then returns to the heel or upper end of the blank mold as shown in FIGS. 6 and 7 so that counterblow air can be brought on through the plunger to blow the parison up in the blank mold into a rigid position and make it ready for the mold side of the machine which is not shown in the drawings, but is well known in glass bottle making practice.

The above mentioned method and operation of the separate funnel slows any speed effort of the glass making machines and it is a matter of great expense to make this separate equipment for this procedure and operation. To eliminate the expense and to gain more speed, a funnel opening 98 is cast directly in the top of the blank mold 96 with the added feature of the present invention in introducing the settle-blow air into the blank mold through the present alterations of the baffle. This method and apparatus may be used with the Blow-and-Blow Method as well as with the Press-and-Blow Method with the addition that the present baffle may be used for several different applications without the addition or cost of a new baffle for each one.

Figure 8:
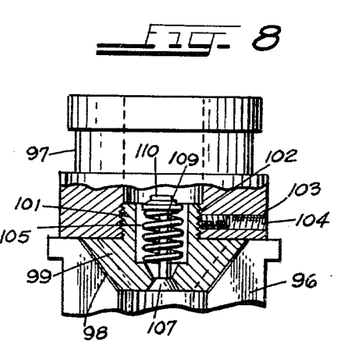
FIG. 8 is a part sectional view of an improved baffle head as also shown in FIGS. 6 and 7 to conform to a funnel opening at the top of a bottle forming blank mold.
Figure 8A:
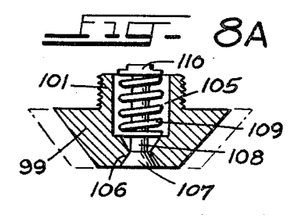
FIG. 8A is a sectional view of a separate valve holder projection as applied to a baffle head and conforming in diameter to the funnel in the forming blank mold.

This is done by providing a valve holder projection 99 which extends from the baffle 97 and is tapered on the outside to fit into the funnel opening 98 in the heel of the blank mold with a slight clearance between the surfaces of approximately seven thousandths of an inch. The valve holder projection 99 is preferably made detachable from the baffle head by forming it with a short threaded stem 101 which fits into a threaded opening at the bottom of the baffle so that it may be exchanged for another one that will fit another funnel which relates to another blank mold instead of 96, thus saving a lot of expense and trouble to provide a new funnel for every different blank mold and saving the cost of another baffle. In other words, one baffle could be used for a dozen or more job applications. The funnel and its opening 98 which is formed on the blank mold 96 shows the right size for the particular supply of glass in forming the desired bottle. Machining the funnel and the projection 99 to have a clearance of approximately seven thousandths of an inch is for the purpose of allowing the escape of air in blowing out the blank.

In changing an ordinary baffle head for a baffle 97 as shown, the baffle facing must be machined flat to fit on the end of the blank molding 96 surrounding the funnel. A lock opening 103 is drilled at the side of the baffle into the opening 102 and threaded to receive a lock screw 104 which engages the threaded stem 101 of the valve projection 99. As shown in FIGS. 6-8A, the projection 99 has a central recess 105 extending through the stem and connected through the projection with a beveled valve seat 106 at the outer end of the projection. A valve 107 is adapted to engage the seat 106 and to form a flat surface at the end of the projection when the valve is closed.

Extending from the valve inwardly in the projection is a stem 108 surrounded by a coil spring 109 which bears at one end against the bottom of the recess 105 and at the other end against a washer or head 110 secured to one formed integral with the upper end of the stem, the spring normally acting to hold the valve 107 close upon its seat 106. The spring 109 has a slight tension so that it will not require much pressure to open it in the projection 99 for pressure to the glass.

After glass enters the blank mold from the position shown in FIG. 5 to that shown in FIG. 6, air is forced in through the baffle forcing the valve 107 to open, releasing air against the glass heel, forcing the glass down into a split neck ring 111 after the desired amount of air is used, the baffle still remains on top of the funnel, but this air is shut off by operation of the control button on the drum 22 and the spring 109 returns the valve 107 to the off position as shown in FIG. 7, and the counter-blow blows up the glass in the blank and at the same time seats the glass at the bottom against the valve 107 to form a flat bottom on the heel of the glass. After the parison has been formed in a sufficiently rigid condition, the baffle is raised, the blank mold 96 opens up and the parison is then ready for the mold side of the machine in further completing the bottle which is outside of the scope of the present application.

A baffle head comprising a baffle 97 and a valve holder projection 99 may be provided for each separate job or different valve holder projections 99 may be removably applied to the same or different baffles 97 so that these heads with adjustable and replaceable projections may be usable over and over again for many jobs and the clearance of seven-thousandths of an inch between the valve holder projection and the funnel opening at the end of the blank are maintained for the escape of air in counterblowing the parison from the position shown in FIG. 6 after the valve 107 is closed to the position shown in FIG. 7 to permit the escape of air at the top of the parison.

Figures 9, 10, 11, 12, 13, 14, 15:
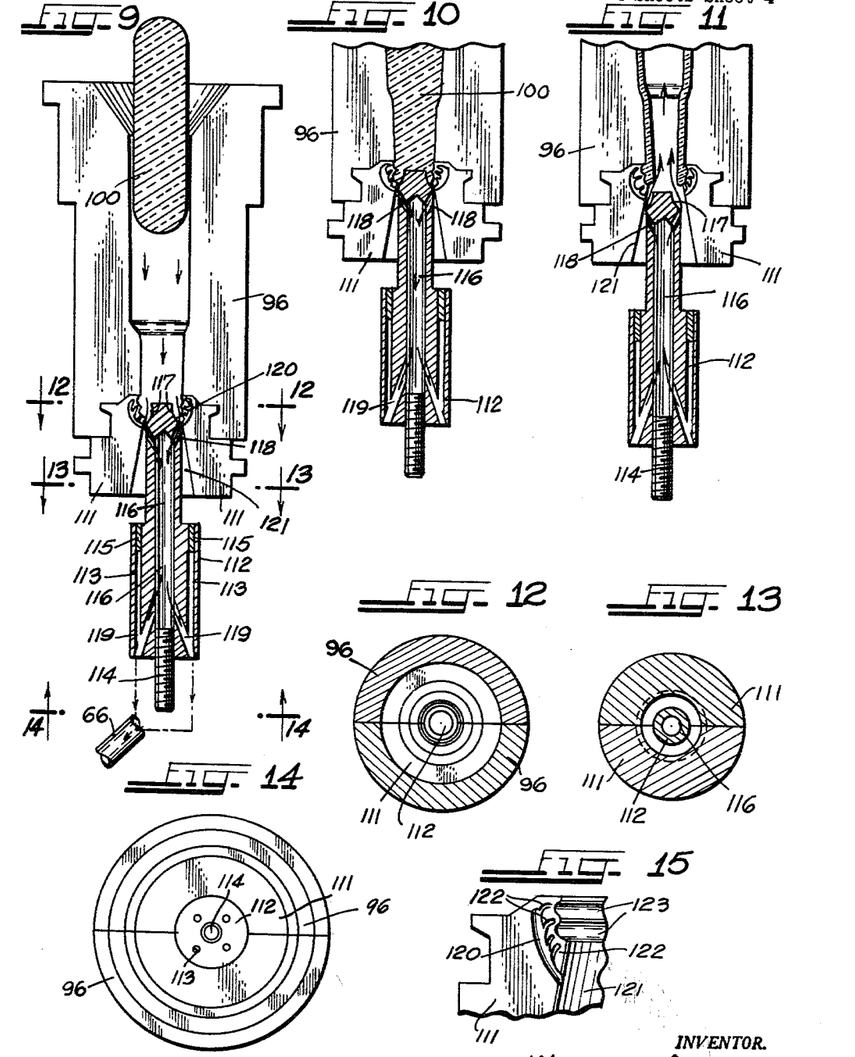
FIGS. 9, 10 and 11 are part sectional views of a split blank mold holder showing a new and improved vacuum-pressure plunger for directing vacuum flow in FIGS. 9 and 10 from the plunger base and the positions of the modified plunger therein and also in admitting counter-blow to the bottle as shown in FIG. 11, corresponding to FIGS. 5 to 7.
FIG. 12 is a sectional view taken on the line 12—12 of FIG. 9.
FIG. 13 is a sectional view taken on the line 13—13 of FIG. 9.
FIG. 14 is an end view of the plunger as taken on the line 14—14 of FIG. 9.
FIG. 15 is a fragmentary enlargement of a portion of one side of a neck ring with vacuum passages, as shown in FIGS. 9, 10 and 11.

After the two parts of the blank mold 96 close for the formation of a bottle, a thimble or split neck ring 111 and a plunger 112 move up into position at the bottom of the blank mold. This plunger may be formed from a plunger body used with an ordinary Press-and-Blow or Blow-and-Blow method in which there are four or more longitudinal bores 113 extending endwise through a portion of the plunger to connect the plunger at the bottom with a source of pressure (not shown) and to connect the upper end around and through the plunger and thimble (not shown) at the top; and with a stud 114 threaded into the lower end of the plunger for operating it.

To change the former plunger for the present operation, the longitudinal bores 113 are permanently closed by plugs 115 at the upper ends thereof, the stud 114 is removed and a longitudinal passage 116 is formed centrally in the plunger from the drilled hole for the stud close to the upper end thereof terminating about one inch from the upper end of the plunger.

At the upper end of the plunger is a rounded finish seat 117 which extends into a bottle and around the outside of the plunger just below the finish seat are drilled a number of holes 118 extending from the bottom of the finish seat to the central longitudinal passage 116 at angles of about 30° thereby providing the vacuum holes at the top for the plunger. At the bottom of the plunger and drilled at angles thereto are drilled holes 119 extending from the lower ends of the longitudinal bores 113 to the central bore or longitudinal passage 116 in the plunger, clearing the end of the stud 114 when it is inserted at the bottom of the plunger and the outer ends of these holes 119 registering with pipes and other connections leading to the single line 66 for both counterblowing vacuum which extends from the valve block 60. As thus altered, the plunger is ready to be mounted in regular attachment for the plunger head. In other words, the vacuum will travel through the same holes in the plunger in which the counterblow air will travel, thus allowing vacuum to cool the plunger as well, and the counterblow air giving the plunger much cooler operation for greater speeds.

The thimble or split-neck ring 111 is also altered by providing grooves 120 as shown more clearly in FIG. 15 which extend from a central thimble opening 121 with branches 122 therefrom extending close to neck ring grooves 123 which form the neck of a bottle. These grooves 120 and 123 extend close to the grooves 123 in order to permit more vacuum flow from the neck ring area, following the finish of the ring, but yet spaced at least thirty-thousandths of an inch from the neck ring grooves so that they do not come in contact with the actual finish of the neck ring. This grooving may be done with a cutting tool such as a chisel with a very sharp edge and the venting vacuum lines are cut in the ring so they line up with holes 118 in the plunger when the plunger is in its UP position as shown in FIGS. 9 and 10. The purpose of the holes is to permit the vacuum to come in direct contact with the glass but yet not pulling the glass into the plunger area. In some old neck rings, the vacuum venting lines should be extended all the way to the thimble area.

In the machines commonly used today, the plungers have been holding up efforts to speed up movement and to perfect lighter weight wear. The plunger commonly used with the Blow-and-Blow method does not give precise control with the counterblow or proper cooling for greater speeds. The holes in the plunger that let the air in for the counterblow in the blank are so arranged that they are below the thimble attached to the plunger head. These holes are for the sole purpose of letting air contact with the glass to blow the glass up in the blank to form a stiff parison before entering the mold for the mold blow. This type of plunger is used with the Blow-and-Blow method. The only way for air to reach the glass with the Counterblow Method is on the outside of the plunger then up into the glass parison. This is used with all machines today with the Blow-and-Blow methods. This air blowing on the outside of the plunger does not have a chance or the time to cool the plunger or the neck ring because not enough air is brought into contact with the plunger, it merely rushes by it on to the ring and into the glass that is in the blank. The hot air that is exhausting back from the counterblow exhaust can only escape through the vents on to the neck ring and since it is preheated from the heat of the glass, it does not give enough cooling for the plunger, thus resulting in a hot plunger causing the finish on the bottle to melt away with the compressed air.

Since the plunger is running hot, the entire machine must run at a slower speed to permit the plungers to become cooler. Air for the counterblow is released from the machine valve block 27 and from the same compressed air used to operate the entire machine, and since this air is already heated to about 100°, this adds to the difficulties in the effort to cool the plungers. Compressed air released by a control of buttons on the timing drum is forced up into the plunger head, then into the neck ring and into the parison. This air being already heated, also delays the timing of the plunger in and out of the glass, thereby causing more loss of time in the efforts to gain more speed from the old Hartford individual section machines.

In the detailed vacuum pressure showing of FIGS. 9, 10 and 11 for finishing the neck of a bottle in addition to the described operation of FIGS. 5, 6 and 7, the plunger 112 is moved in accordance with the operation of the control drum 22 so that the holes 118 near the tip of the plunger are at the bottoms of the grooves 120 formed in the split neck ring 111 at about the time that the measured quantity of glass reaches the split neck ring 111. At this time the plunger 71 of the valve 60 is moved to the position shown in FIG. 3 by pressure in the trip line 92 connecting the single line 66 from the plunger 112 through the central sleeve 74 to the vacuum 29 as previously set forth, thereby drawing the gob 100 downwardly into the blank 96 and closely into the neck ring grooves 123 of the thimble or split neck ring 111. Although this action is continued and completed with the vacuum applied to the condition shown in FIG. 10 at which time the baffle 97 has been returned to the top of the blank mold 96. The valve 107 in the valve holder projection 99 which is held by a light pressure spring 109 may be opened by the glass moving downward in the blank mold which would tend to be retarded and held back by a vacuum on top of the glass if the projection 99 fits closely in the funnel opening 98. Opening the valve insures that the gob of glass will be drawn downwardly into the neck ring by the vacuum in the plunger 112.

In similarly altering the plunger thimble and neck ring construction as shown at the lower ends of FIGS. 5, 6 and 7, a thimble 110a is mounted in a split neck ring 111a and a plunger 112a is movable by the bottle making apparatus in a well known manner to effect the Press-and-Blow and Blow-and-Blow Methods as previously set forth and in accordance with the present method and operation, these parts may be changed and used in the present method by providing the plunger 112a with a central passage 116a terminating near the top of the plunger but provided with passages 117a extending outwardly at an angle to the central passage and cooperating with similar angular passages 118a at the top of the thimble 110a so that these passages will communicate with grooves 120a in the split sides of the neck ring 111a.

This construction will permit suction to be applied at the lower end and at the outside of the neck portion of the mold as shown in FIG. 5 which will be continued until the glass gob is drawn downwardly into the neck ring as shown in FIG. 6 whereupon the valve 107 will be opened, and then by the operation of the glass making apparatus (not shown, but in common practice), the plunger 112a is drawn downwardly in the thimble 110a as shown in FIG. 7 and pressure is applied to the neck of a bottle to blow it upwardly as shown in FIG. 6 in forming a parison. At this time, the baffle 97 is closed on top of the blank mold 96, the projection 99 fitting into the funnel opening 98, the valve 107 being closed because of the upward pressure and air from the mold on top of the parison escaping through the clearance between the projection and the funnel opening.

In this manner, the thimble, plunger and neck ring of press-and-blow and blow-and-blow machines may be altered to correspond with the plunger as shown in FIGS. 9–11 and the present operation may be easily made applicable to existing machines.

These actions take place quickly in fractions of seconds as determined by the location of the operating buttons 23 on the drum 22 which also cuts the pressure trip line 92 allowing spring 82 to return plunger 71 of the vacuum flow valve to the position shown in FIG. 2. This cuts off the connection between the plunger 112 and its single line 66 and in a fraction of a second changes the connection through the vacuum flow valve 60 from the chilled air supply line 38 through the single line 66 as previously set forth to supply cooled air under pressure through the same passage 116 in the plunger 112 through which the vacuum was drawn. At the same time, the plunger is being withdrawn from the thimble or neck ring 111 as indicated in FIG. 11 so that air under pressure is directed around the finish seat 117 of the end of the plunger 112 and into the center of the parison expanding the glass in the mold in the same relative position as also shown in FIG. 7. At this time, all of these parts receive air from the chilled air supply line 38 after it passes from the cold air valve 30 which receives it from the cooling air coil 32 as previously set forth.

This transfer from vacuum to pressure in the vacuum flow valve is effected in a fraction of a second and by the movement of the valve plunger 71, a matter of one-half of an inch in one direction or the other as explained. Since a single line connection carries both the vacuum and the pressure, there is no delay or dependence upon the operation of other valves and the movement of the plunger 71 from one position to the other is practically instantaneous so that there is no delay in changing from vacuum to pressure or vice versa. The plunger 71 of the vacuum flow valve is snapped from one position to the other by pressure from the trip line 92 against the spring 83 at the other end of the plunger and when the pressure is relieved, the spring returns the plunger to its other limiting position. After the parison is blown out in the blank mold 96 as represented in FIGS. 7 and 11, the walls are set more firmly by the entrance of chilled air from the cold air valve 30 and the vacuum flow valve so that when the plunger is withdrawn and the centers of the blank mold 96 are removed, the parison is in a much firmer condition to be transferred and inverted from the blank mold to the blow mold in the regular course of completion as now performed by existing machines. In accomplishing this transfer, however, it is not necessary to separately remove a funnel piece as the funnel is now combined with the forming blank mold 96 as herein shown and described.

By mounting this vacuum flow valve on a standard or commonly used Hartford individual section machine, settle-blow action can be entirely eliminated for instead of the compressed air, vacuum from this flow valve will perfect the bottle finish with certain very simple alterations to the plunger neck rings and thimbles. Vacuum induced through the cylinder of the Hartford machine requires no alteration to the cylinders whatever, as the vacuum is drawn through the same passages and lines in which the compressed air is blown in for the counterblow.

The present vacuum flow valve is mounted at the back of the valve block 27 as now commonly provided in existing machines and the pressure supply lines are controlled by the buttons and timing of the drum 22 regulating the vacuum and counterblow to the precise split second timing which is desired. This valve directs the counterblow air and the vacuum through the same valve to make vacuum finishes at the neck of a bottle and to comply compressed air to blow up the parison in the forming blank. The valve 60 is not removed when converting from one job to another such as from the present method to the Blow-and-Blow Method or to the Press-and-Blow Method, thus the valve is in itself not only a time saver on job changes, but also for the whole operation of perfecting a lighter weight bottle. It perfects the finish by the vacuum and draws only the needed amount of glass and immediately after the finish is completed, the counterblow is brought on 25° (on the drum) earlier, thus removing and saving glass in the neck region of the bottle. This excess glass is now removed by a vacuum and the excess glass is then blown into the sides of the bottle adding more strength and producing lighter weight bottles, the vacuum finishes being made more even with the twirling and twisting action of the vacuum drawing the glass down into the neck ring and on to the plunger. With this vacuum method, many alterations of the blank are not now necessary for if more glass is needed to perfect the finish, all that is necessary is to permit the vacuum to remain in contact with the glass for a longer period of time and if glass is needed to perfect the finish, the vacuum is shut off much earlier.

The present valve controls not only the finish, but also the cooling process for the plunger, neck ring and thimble area, using chilled air from the cold air valve 30 at a temperature of 45° or less which is timed in conjunction with the vacuum flow by the same vacuum flow valve 60 and its single supply line 66. This brings colder air into the parison as shown in FIGS. 7 and 11 to make it more rigid so that it can be swung to the mold side more quickly and at far greater speeds without bending or collapsing. Chilled air when introduced to the Blow-and-Blow Method produces a gain in the time of cooling the tip of the plunger, for by cooling the plunger tip with the Blow-and-Blow Method and the present Vacuum Flow Method together, the finish is set up in the neck ring about seven times as fast, thus permitting the chilled counterblow air to be brought on 25° (of drum operation) earlier. The advance time gained with both of these valves is the precise measure now needed in the efforts to greater speeds of operation. The buttons 23 now adjustable in slots 24 of the drum and the operating levers and valves thereof are used in precisely the same way for the present method as in the Blow-and-Blow or Press-and-Blow Methods with perhaps only a change in timing by adjusting the buttons for greater speed in operation of the present device. Different connections may be made with the chilled air lines 38 or 39 as above set forth when converting from one to the other, shutting off the vacuum valve line and regulating the controls on the press-and-blow valves which will control the precise press of the plungers in the particular application of the existing machines.

The present vacuum valve and press-and-blow valve mounted together and all lines in conjunction with each other and with the cold air valve, eliminate the press-and-blow valve adjustment entirely from the back of the valve block 27 and with the removal of this valve, a more precise control of both methods of making a bottle is attained. This vacuum operation in conjunction with the applicant's press-and-blow valve are under the control of the operator at all times and after once being timed in conjunction with the buttons, these valves need not be set, removed or regulated at a given time which eliminates about 4 hours when converting the bottle making machine from one job to another. This method of attaching and applying the cold air and vacuum flow valves eliminates costly expenditures in the alteration of blank equipment as the vacuum which pulls the glass down into the neck and finish region controls the glass so effectively that no shop work or milling of the blanks is needed to obtain some glass in any desired area. This process elimination of the settle-blow may now replace the old settle-blow method opening a greater field for speedier operation and lighter weight wear.

In attempting to perfect the settle-blow operation in the previous types of machines, there is also the motion of a funnel which must also be controlled by the drum to guide a gob of glass into the blank and to remain on the blank until the settle-blow has completed the finish. This funnel action requires about 30° of timing on the drum which, of course, is added to the settle-blow motion and causes a time lag on the drum of 90°. After the finish is blown through the funnel, the baffle due to the timing of the drum swings away and then the funnel through the timing of the drum also swings away, the finish now being completed. The baffle then is returned to the heel of the blank pressed down tightly with compressed air so that the counterblow can then be admitted to blow out parison (as in FIG. 5). These are the operations that slow down the efforts of the manufacturers toward greater speeds and lighter weight wear. The sole function of the settle-blow is to perfect the finish with compressed air at the heel of the blank.

It must blow on the glass surface as well as the metal surface of the blank to make better bottles. To cut down the settle-blow time would lighten the amount of glass in the neck area. Many machines have tried to eliminate settle-blow, its various defects and delays, but up to the present time, no method other than that of the present invention is known for successfully accomplishing it. This method and apparatus may be applied as an attachment to existing machines and may also be incorporated without material change in new machines for similar purposes. The present apparatus improves change-over from one method to the other with the least loss of time and the least necessary machine changes. A single operating valve controls vacuum and pressure and also the admission of cooled air. Other time saving economies include the elimination of a separate funnel, the saving of time in separate operation of funnel and baffle head parts as well as the instantaneous changes from vacuum to pressure in a single supply line.

While a preferred embodiment of this invention has been described in some detail, together with the improved method of operation made possible by the apparatus, it should be regarded by way of illustration and example rather than a restriction or limitation thereof, as changes in the construction, combination and arrangement of the parts may be made without departing from the spirit and scope of the invention.

I claim:

1. The method of forming glass bottles on a glass making machine which comprises applying vacuum and counterblow to the outside and inside of the neck of the bottle through the same passages and instantaneously changing from vacuum to pressure at the neck of the bottle, and cooling the pressure of compressed air applied to the counterblow for faster cooling in the neck ring finish area of the bottle.

2. The method of eliminating settle-blow and improving the finish at the neck end of a bottle which comprises feeding a measured quantity of glass into a mold, applying vacuum suction and counterblow pressure to the outside and inside of the neck of the bottle through the same supply instantaneously changing from suction to pressure and applying cooled air to the inside of the bottle to cool the walls in applying pressure thereto.

3. The method of eliminating settle-blow in making glass bottles and in changing over a bottle making machine from a blow-and-blow method to a vacuum and counterblow method which consists in feeding a measured quantity of glass downwardly in a mold into the neck of the bottle by vacuum through the central opening of the neck of the mold in the absence of settle-blow from above, and counterblowing the glass outwardly from the neck of the bottle to the same passage through which the vacuum is withdrawn, instantaneously changing from vacuum to pressure in the passage, in applying cooling air in furnishing the counterblow pressure and substituting vacuum suction at the neck of the bottle for the settle-blow pressure for forcing glass under pressure into the neck of the bottle from the base thereof.

4. The method of eliminating settle-blow and reducing the time in making glass bottles which comprises feeding a gob of glass into the top of a mold, drawing the glass downwardly by vacuum through the central opening of the neck of the mold in the absence of settle-blow from above, finishing the exterior surface of the neck of the bottle by application of a vacuum suction through a passage at the end of a bottle, instantaneously changing from vacuum to blow-out pressure through the same passage to the inside of the neck of the bottle, cooling the air supply under pressure to the inside of the bottle and thereby causing the neck and walls of the parison to become settled more clearly for change-over to the blow-out mold and reducing the time of blow-out due to the cooling to speed up production of the bottle.

References Cited in the file of this patent

UNITED STATES PATENTS

| | | |
|---|---|---|
| 1,350,375 | Miller | Aug. 24, 1920 |
| 1,694,867 | Samuelson | Dec. 11, 1928 |
| 1,759,210 | Soubier | May 20, 1930 |
| 1,853,861 | Hatch et al. | April 12, 1932 |
| 1,957,410 | Miller | May 1, 1934 |
| 1,959,428 | Hoge | May 22, 1934 |
| 2,129,614 | Bridges | Sept. 6, 1938 |
| 2,142,954 | Rowe | Jan. 3, 1939 |
| 2,334,653 | Senkbeil | Nov. 16, 1943 |
| 2,379,830 | Samuelson et al. | July 3, 1945 |
| 2,471,369 | Garwood | May 24, 1949 |
| 2,702,444 | Rowe | Feb. 22, 1955 |

FOREIGN PATENTS

| | | |
|---|---|---|
| 404,308 | Great Britain | Dec. 29, 1933 |
| 547,474 | Great Britain | Aug. 28, 1942 |